United States Patent [19]

Fuderer

[11] Patent Number: 4,512,780

[45] Date of Patent: Apr. 23, 1985

[54] PRESSURE SWING ADSORPTION WITH INTERMEDIATE PRODUCT RECOVERY

[75] Inventor: Andrija Fuderer, Antwerpen, Belgium

[73] Assignee: Union Carbide Corporation, Danbury, Conn.

[21] Appl. No.: 549,746

[22] Filed: Nov. 8, 1983

[51] Int. Cl.$^3$ .............................................. B01D 53/04
[52] U.S. Cl. ............................................ 55/26; 55/62; 55/68; 55/75
[58] Field of Search .................. 55/25, 26, 33, 58, 59, 55/62, 68, 74, 75

[56] References Cited

U.S. PATENT DOCUMENTS

| Re. 31,014 | 8/1982 | Sircar | 55/26 |
|---|---|---|---|
| 3,176,444 | 4/1965 | Kiyonaga | 55/26 |
| 3,226,913 | 1/1966 | Avery | 55/25 |
| 3,430,418 | 3/1969 | Wagner | 55/25 |
| 3,564,816 | 2/1971 | Batta | 55/26 |
| 3,636,679 | 1/1972 | Batta | 55/26 |
| 3,796,022 | 3/1974 | Simonet et al. | 55/25 |
| 3,986,849 | 10/1976 | Fuderer | 55/25 |
| 4,077,779 | 3/1978 | Sircar et al. | 55/25 |
| 4,077,780 | 3/1978 | Doshi | 55/26 |
| 4,171,207 | 10/1979 | Sircar | 55/26 |
| 4,280,824 | 7/1981 | Lassmann et al. | 55/26 |
| 4,371,380 | 2/1983 | Benkmann | 55/26 |
| 4,375,363 | 3/1983 | Fuderer | 55/25 |
| 4,414,191 | 11/1983 | Fuderer | 55/26 X |

FOREIGN PATENT DOCUMENTS 0008882 12/1981 European Pat. Off. .

OTHER PUBLICATIONS

Breck, Zeolite Molecular Sieves, Structure, Chemistry and Use, pp. 715-717, (John Wiley and Sons), 1974.

*Primary Examiner*—Robert Spitzer
*Attorney, Agent, or Firm*—Alvin H. Fritschler

[57] ABSTRACT

A pressure swing adsorption process is used to achieve intermediate product recovery by the introduction of a gas displacement step before, simultaneous with or subsequent to pressure equalization between beds of a multi-bed adsorption system. A cocurrent depressurization step is then employed to achieve intermediate product recovery. A portion of said intermediate product or of the more readily adsorbable component recovered from a bed advantageously being employed to provide displacement gas for another bed in the adsorption system.

40 Claims, No Drawings

PRESSURE SWING ADSORPTION WITH INTERMEDIATE PRODUCT RECOVERY

BACKGROUND OF THE INVENTION

1. Field of the Invention

The invention relates to the purification of gases. More particularly, it relates to a process for enhancing the recovery of the intermediate component of adsorbable feed gas mixtures.

2. Description of the Prior Art

The pressure swing adsorption (PSA) process provides a highly desirable means for separating and purifying gases, such as hydrogen, contained in a feed gas mixture thereof with impurities that are selectively adsorbed by one or more adsorbent beds in a PSA system. Adsorption occurs in such beds at a higher adsorption pressure, with the selectively adsorbable impurities thereafter being desorbed by pressure reduction to a lower desorption pressure. The beds may be purged at said lower pressure for further desorption and removal of impurities, if desired, before repressurization to the higher adsorption pressure for adsorption of impurities from additional quantities of the feed gas mixture as the processing sequence is carried out, on a cyclic basis, in each bed in the adsorption system.

The PSA process is commonly employed in multibed systems. The Wagner patent U.S. Pat. No. 3,430,418, discloses a PSA process and system employing at least four adsorbent beds arranged for carrying out a particular PSA processing sequence on a cyclic basis. This sequence includes higher pressure adsorption, cocurrent depressurization to intermediate pressure with release of void space gas from the discharge or product end of the bed, countercurrent depressurization to a lower desorption pressure, and repressurization to a higher adsorption pressure. Wagner discloses the passing of released void space gas from one bed directly to another bed initially at its lower desorption pressure. The pressure in the two beds is thereby equalized at an intermediate pressure. Additional void space gas can be released from the product end of the bed being cocurrently depressurized, with such void space gas being used to provide purge gas to another bed in the PSA system before such other bed is repressurized from its lower desorption pressure. After each bed has been repressurized to an intermediate pressure level by such pressure equalization, it is further repressurized from the intermediate level in part by the countercurrent addition of product effluent to the product end of the bed being repressurized.

In a further development in the art, the Fuderer et al patent U.S. Pat. No. 3,986,849, discloses the use of at least seven adsorbent beds, with the feed gas mixture being introduced to the feed end of at least two adsorbent beds, in overlapping identical processing cycles, at all stages of the PSA processing sequence. Each bed, in turn, undergoes three pressure equalization steps prior to repressurization to the higher adsorption pressure, with said steps being carried out in a particular manner achieving higher product purity.

The PSA process, as represented by the disclosures of such patents, is a highly desirable and practical commercial process for the purification of gases such as hydrogen. It has the advantage of being capable of producing very high purity product, e.g. in excess of 99.9 percent pure hydrogen product. The PSA process can be used to treat a wide range of available feedstocks, and is not limited to use with a particular hydrogen-containing or other feed gas stream. No pretreatment or post treatment steps are required as part of the process, other than such conventional impurity removal as may be desirable or required to avoid undue degradation of the adsorbent. In addition, there is very little pressure drop between the feed gas stream and the product gas so that the product gas is available at the adsorption pressure level for further use downstream of the PSA system and for repressurization of each bed to said adsorption pressure from a lower desorption level or from the intermediate pressure level achieved during one or more pressure equalization steps carried out as indicated above.

It is also known in the art that selective adsorption process, such as the PSA process referred to above, can be employed to recover the more strongly adsorbable component from a gas mixture as the desired product. For example, the PSA process can be employed to recover 99% carbon dioxide from a gas mixture containing said carbon dioxide as a more readily adsorbable component, together with other, less readily adsorbable components, such as methane, hydrogen, nitrogen and the like. The processing cycles employed for such purposes are essentially the same as those employed when the PSA process is utilized for the production of the less readily adsorbable component.

When such well-known PSA cycles are employed for the separation of gas mixtures containing a number of components, the less readily adsorbable component and/or the more readily adsorbable component, as recovered during the adsorption and/or desorption steps, respectively, may contain components having intermediate adsorbable characteristics, vis-a-vis the more readily and the less readily adsorbable components of the mixtures themselves, depending upon the processing conditions under which the PSA process is carried out. Thus, in the separation of a gas mixture containing hydrogen, argon, nitrogen and carbon monoxide, with hydrogen being the less readily adsorbable component and carbon dioxide being the more readily adsorbable component, high purity hydrogen can be recovered with the more readily adsorbable component separated therefrom comprising a mixture of argon, nitrogen and carbon monoxide. Similarly, high purity CO can be recovered as a more readily adsorbable component with the less readily adsorbable component comprising a mixture of hydrogen, argon and nitrogen. It is also possible to employ known PSA cycles so as to obtain a lighter, less readily adsorbable component comprising hydrogen and argon, and a heavier, more readily adsorbable component comprising nitrogen and carbon monoxide.

There are practical applications in the art, however, where it would be desirable to recover the intermediately adsorbable component as a separate product of desired purity rather than to have said component recovered (1) with the less readily adsorbable component, (2) with the more readily adsorbable component, or (3) as part of a waste stream also containing said less and more readily adsorbable components. As used herein, the terms "intermediately adsorbable component" "intermediate component" and "intermediate product" are used to denote a single gas constituent or more than one such constituent of a gas mixture also having a less readily adsorbable component and a more readily adsorbable component. In the illustrative gas mixture referred to above, it may thus be desired to recover argon as an intermediate component, while recovering hydrogen as a less readily adsorbable component and a mixture of CO and nitrogen as a more readily adsorbable component. In other circumstances, it may be desirable to recover nitrogen as an intermediate component, with a mixture of hydrogen and argon comprising a less readily adsorbable component and a mixture of CO and additional nitrogen comprising the more readily adsorbable component. In another variation, it may be desirable to separate and recover a mixture of argon and nitrogen as an intermediate component, apart from hydrogen as the light, less readily adsorbable component and CO as the heavy, more readily adsorbable component. It has not hertofore been feasible to make such separations and recoveries of intermediate components of gas mixtures in a manner compatible with conventional, convenient PSA processing. Upon the development of such convenient processing capability for intermediate product recovery, those skilled in the art will appreciate that a variety of practical commercial PSA operations could be advantageously carried out so as to achieve desirable intermediate product recovery.

One approach heretofore suggested for such development of intermediate product recovery capability is set forth in European Patent Specification No. 0 008 882, published Dec. 30, 1981, in the name of Shivaji Sircar. Disclosed therein is the separation of multicomponent feed gas mixtures having a primary key component, a secondary key component and a tertiary component. For this purpose, an adsorption system comprising a plurality of bed pairs, i.e., two beds in series, is provided, with each bed pair functioning in the manner of a single bed in accordance with the conventional PSA processing techniques referred to above. The feed gas mixture passes through a first bed of the pair and then through the other, with a tertiary component adsorption front established in the first bed and a secondary key component adsorption front being established in the second bed of the pair. The flow of the feed gas mixture is then interrupted, and gas flow between the beds are discontinued. The beds are then separately subjected to rinsing, product reduction, purge and partial repressurization steps prior to the re-establishing. of flow therebetween to achieve final repressurization, initiation of the flow of the feed gas mixture thereto and repetition of the processing cycle. While the disclosed process can be employed for intermediate product recovery, the complex processing steps necessarily associated with the use of pairs of adsorbent beds in multi-feed systems, together with the associated complexity of lines, valves, controls and the like, serve to limit the practical applicability of the process. There remains in the art, thereafter, the need for an improved PSA process capable of facilitating intermediate product recovery in a practical, convenient manner.

It is an object of the invention, therefore, to provide an improved PSA process capable of enabling intermediate product recovery to be achieved.

It is another object of the invention to provide a process facilitating said intermediate product recovery in a manner compatible with conventional multi-bed PSA systems.

It is a further object of the invention to provide a PSA process having advantageous flexibility in recovering desired intermediate product from multicomponent feed gas mixtures.

With these and other objects in mind, the invention is hereinafter set forth in detail, the novel features thereof being particularly pointed out in the appended claims.

SUMMARY OF THE INVENTION

The intermediate component of a feed gas mixture is recovered as a separate product in PSA processing by first assuring that the less readily adsorbable component of a multicomponent feed gas mixture is essentially completely removed from an adsorbent bed and by then employing a cocurrent depressurization step to remove said intermediate component from the product end of the bed. In various adsorption systems having four or more beds, particularly desirable processing cycles are employed, with a portion of the more readily adsorbable component recovered during countercurrent depressurization or a portion of the intermediate component product being conveniently employed as said displacement gas introduced, on a cyclic basis, to each bed in the adsorption system.

DETAILED DESCRIPTION OF THE INVENTION

The PSA process of the invention relates to conventional PSA processing in which each bed of an adsorption system undergoes, on a cyclic basis, higher pressure adsorption, cocurrent depressurization to intermediate pressure level(s) with release of void space gas from the product end of the bed, countercurrent depressurization to lower desorption pressure with the release of desorbed gas from the feed end of the bed, with or without purge of the bed, and repressurization to higher adsorption pressure. The objects of the invention are accomplished, in the separation of a feed gas mixture containing a less readily adsorbable component, an intermediate component and a more readily adsorbable component, by employing a cocurrent displacement step in which the less readily adsorbable component is essentially completely removed from the adsorption bed. The bed is then cocurrently depressurized with the intermediate component being discharged from the product end thereof as a product of desired purity. In the multi-bed adsorption systems to which the invention is directed, the displacement gas used for each bed is advantageously obtained by diverting a portion of the gas released from that or another bed in the system during the cocurrent depressurization or the countercurrent depressurization steps, although other suitable displacement gas may also be employed if available with respect to the overall processing operation in which PSA with intermediate product recovery is being employed.

Those skilled in the art will appreciate that the high pressure adsorption step of the PSA process comprises introducing the feed gas mixture to the feed end of the adsorbent bed at a higher adsorption pressure. The less readily adsorbable component passes through the bed and is discharged from the product end thereof. An adsorption front or fronts are established in the bed with said fronts likewise moving through the bed from the feed end toward the product end thereof. When the feed gas contains a less readily adsorbable component, an intermediate component and a more readily adsorbable component, a leading adsorption front of said intermediate component will be established and move through the bed in the direction of the product or discharge end thereof ahead of a trailing adsorption front of the more readily adsorbable component. By the use of a cocurrent displacement gas essentially free of the less readily adsorbable component, thus having a molar concentration of intermediate and/or more readily adsorbable components, the less readily adsorbable component that remains in the void spaces of the adsorbent bed ahead of the leading adsorption front can be essentially completely displaced from the bed. This enables the intermediate component to be thereafter discharged from the product end of the bed as a product of desired purity by cocurrently depressurizing the bed. As will be indicated below, the cocurrent depressurization step for intermediate product recovery is desirably carried out in addition to the cocurrent depressurization step or steps conventionally employed wherein the void space gas thus released being used for pressure equalization with other beds or to provide purge gas to such beds. Countercurrent depressurization of the bed is carried out subsequent to the intermediate product recovery step, as in conventional PSA processing. When the gas removed from the bed during either the conventional cocurrent depressurization step or the countercurrent depressurization step, or a portion thereof, is diverted to the feed end of another bed for use as the displacement gas, it will be appreciated that said gas is repressurized sufficiently to enable displacement of less readily adsorbable component from the void spaces of the bed to be accomplished. In effect, an impurity front existing in one bed is moved in the direction of either the feed or the product end of one bed and released gas is introduced to another bed so as to facilitate the displacement of less readily adsorbable component from that bed.

The invention can advantageously be practiced in multi-bed PSA systems having a least four adsorbent beds therein. Preferably the invention can be utilized to advantage in systems having four to six adsorbent beds, although it will also be appreciated that the invention can also be employed in larger systems having seven or more beds. It will also be appreciated that, as in conventional practice, the feed gas can be passed to either one bed at any given time or may be passed to at least two beds at any given time depending upon the particular processing cycle desired for any given application of the invention. Also as in conventional practice, the invention may employ one, two, three or more cocurrent depressurization steps, if desired, with the gas released from the product end of the bed during said steps being used by pressure equalization and provide purge purposes as indicated above. The invention thus has a desirable flexibility in recovering intermediate product during PSA processing operations that are essentially compatible with the established and advantageous commercial practice as set forth in the patents referred to above and as otherwise known in the art.

It is within the scope of the invention to separate any feed gas mixture containing a less readily adsorbed component, an intermediate component and a more readily adsorbable component, with said component being understood to comprise one gas or more than one gas having relatively similar adsorption characteristics with respect to the adsorbent employed and the separation and intermediate product recovery desired. Using 5A molecular sieve or other such conventional adsorbent with respect to a gas mixture containing hydrogen, argon, nitrogen and carbon monoxide, hydrogen will be the least adsorbed, argon will adsorb more strongly than hydrogen, nitrogen will be adsorbed more strongly than argon, and carbon monoxide will be the most readily or strongly adsorbed of all the components. In the practice of the invention, it is readily feasible to recover either argon, nitrogen, or both, as the intermediate component at a desired purity level. For such purpose, the feed gas mixture is introduced to the feed end of an adsorption bed at a higher adsorption pressure, with the less readily adsorbable component, i.e., hydrogen or hydrogen together with argon, being removed from the product end of the bed. A displacement gas essentially free of hydrogen and having a molar concentration of said nitrogen and/or carbon monoxide greater than in the feed gas mixture is introduced to the feed end of the bed so as to displace residual amounts of hydrogen component from the void spaces of the bed and from the bed itself. The bed is also cocurrently depressurized so as to release additional void space gas from the product end of the bed. This may be carried out either before said cocurrent displacement step, during or after said step. Those skilled in the art will appreciate that the cocurrent depressurization step and said cocurrent displacement step will be carried out so as to essentially completely displace hydrogen from the bed, with said essentially complete displacement being consistent with the intermediate product purity specification established for any particular application. The bed is then further cocurrently depressurized to discharge the intermediate component, i.e. argon, from the product end of the bed as a product at the desired purity. The bed may then be countercurrently depressurized to a lower desorption pressure. The gas removed from the feed end of the bed during this step comprises said more readily adsorbable component, a portion of which may be used to provide the co-purge or displacement gas recycled and added to the feed end of the bed or to another bed in the system. The bed is then repressurized to said higher adsorption pressure. The gas released from the product end of the bed during the cocurrent depressurization of the bed, comprising hydrogen, may be used to purge the bed at its lower desorption, pressure prior to repressurization thereof. Optionally, the bed may be so purged without a preceding, separate countercurrent depressurization step. As carried out in the manner of this embodiment of the invention, an intermediate component, such as argon, or nitrogen or a mixture thereof, may be recovered at a desired purity level from the original feed gas mixture.

In another illustrative example, it is desired to employ the PSA process of the invention to obtain a moderate purity, e.g. minimum 75%, carbon monoxide stream having a maximum of 7% hydrogen from a partial oxidation gas available at 12–13 bar and having the following composition in mol. %: hydrogen, 62%; CO, 31%; $CH_4$, 1.5%; $CO_2$, 3.5% and other (including nitrogen, and argon), 2.0%. The CO-containing product gas is to be employed in the production of a chemical intermediate by a process that consumes CO and produces $CO_2$. A CO and $CO_2$-rich gas is purged from the reaction by which the chemical intermediate is produced, with this purged gas containing about 55% CO and about 20–25% $CO_2$. This gas, essentially free of hydrogen and having a molar concentration of both intermediate and more readily adsorbable components greater than in the feed gas mixture to the PSA system, can thus be used as the displacement gas used to displace hydrogen in the less readily adsorbable component from the beds of the adsorption system. For this separation, a four bed adsorption system may be conveniently employed, with the 62% hydrogen-containing feed gas being introduced to the feed end of each adsorbent bed, in sequence, at 12–13 bar. In this embodiment of the invention, the cocurrent displacement step is carried out after the initial feed-adsorption step, with cocurrent depressurization for pressure equalization and provide purge purposes being carried out after said displacement step. The pressure is reduced to about 4.5 bar during such cocurrent depressurization steps. The bed is then further cocurrently depressurized from 4.5 to 1.5, bar, with the desired CO-rich intermediate product being recovered from the product end of the bed during this step. Countercurrent depressurization to 1 bar and purging of the bed are then carried out prior to repressurization of the bed to higher adsorption pressure for use in the treatment of additional quantities of the feed gas mixture as cyclic operations are continuously carried out in said bed. The practice of the invention can be illustrated by Table I below with respect to the indicated four bed embodiment of the invention.

TABLE I

| BED NO. | CYCLE |   |   |   |   |   |
|---|---|---|---|---|---|---|
| 1 | A/C | 1 E | BD | D P | 1 | R |
| 2 | 1 R | A/C | 1 E | BD | D P |   |
| 3 | BD D P | 1 R | A/C | 1 E | BD |   |
| 4 | 1 E | BD | D P 1 | R | A/C |   |

In this Table, A represents an adsorption step at higher adsorption pressure, with the feed gas mixture being introduced to the feed end of the bed and the less readily adsorbable component being discharged from the product end thereof; C represents cocurrent displacement by the introduction of gas essentially free of the less readily adsorbable component to the feed end of the bed so as to essentially completely displace said less readily adsorbable component from the bed; 1 represents a cocurrent depressurization-pressure equalization step between a bed that has completed its cocurrent displacement step and a bed that has been purged at lower desorption pressure; E represents a cocurrent depressurization step with release of additional quantities of less readily adsorbable component and passage of said gas to an external storage vessel for use in providing purge gas to a bed in said system; BD represents a cocurrent depressurization step with discharge of said intermediate component from the product end thereof as CO-enriched product of desired purity enhancement; D represents a countercurrent depressurization step; P represents a purge step using gas withdrawn from said external storage vessel; and R represents repressurization to higher adsorption pressure. In the process of the illustrated example, it will be seen that only one bed of the system undergoes the adsorption-cocurrent displacement processing sequence at any given time in the overall cycle. The moderate purity hydrogen product obtained in this example, i.e. at a 90–94% purity, can be recycled to the main gas stream to the partial oxidation unit. The more readily adsorbable component, which is $CO_2$, is removed from the bed during steps D and P, along with part of the methane and the CO not recovered as intermediate product during step BD.

It will be seen from the Table that the PSA cycle of this embodiment of the invention is similar to the conventional PSA cycle, with the incorporation of said C and BD steps being entirely compatible with such conventional processing. The process described is very advantageous in the production of intermediate component CO having practical product specifications such as indicated above from a multicomponent feed gas mixture.

As an illustrative example of the flexibility available in the practice of the invention, the gas separation and intermediate product recovery of the example above can also be conveniently carried out in a five bed adsorption system in which only one bed is on adsorption at any given time and a portion of the intermediate component is employed for recycle to the feed end of a bed as displacement gas. The processing cycle employed in this embodiment is illustrated in Table II below:

TABLE II

| BED NO. | CYCLE |   |   |   |   |
|---|---|---|---|---|---|
| 1 | A | C | 1 E | BD | 1 R |
| 2 | 1 R | A | C | 1 E | BD |
| 3 | BD | 1 R | A | C | 1 BD |
| 4 | 1 E | BD | 1 R | A | C |
| 5 | C | 1 E | BD | 1 R | A |

In this Table II, A, C, 1, E, BD, P and R all have the same meanings as in the Table I example above. It will be seen that each bed, in turn, undergoes adsorption; cocurrent displacement; cocurrent depressurization-pressure equalization with the third higher number bed, with the latter bed being repressurized from its lower desorption pressure; further cocurrent depressurization with release of additional quantities of less readily adsorbable component and passage of said gas to an external storage vessel for use in providing purge gas to a bed in the system; cocurrent depressurization with discharge of the intermediate component from the product end of the bed; providing purge gas to the product end of said bed from the external storage vessel, with the bed decreasing to its lower desorption pressure during said purge step, without the inclusion of a separate countercurrent depressurization step prior to purging of the bed; pressure equalization with passage of gas to said bed from another bed in the system initially at higher pressure; and repressurization of the bed to higher adsorption pressure. As the displacement gas used in step C, it is convenient to divert or recycle a portion of the intermediate component discharged from the product bed of the bed during step BD for repressurization and introduction to the bed as displacement gas during step C.

As another illustrative example of the practice of the invention, an off-gas from a steel converter, having a composition consisting essentially of nitrogen, carbon monoxide and carbon dioxide, may be treated to recover carbon monoxide as a desired intermediate product. Such an off-gas, containing 15% nitrogen, 69% CO and 16% $CO_2$ on a mol basis, is introduced to an adsorption system containing six beds, with each bed containing 45 vol.% activated carbon adsorbent and 55 vol.% 13X type molecular sieve adsorbent. At this higher adsorption pressure, a leading CO adsorption front is established and moves in the direction of the product end of each bed ahead of a trailing $CO_2$ front, while the less readily adsorbable component, i.e. nitrogen that may contain some CO, is discharged from the product end of the bed. This gas, or a portion thereof, may be used for the repressurization of another bed. The bed is then cocurrently depressurized with release of less readily adsorbable component, i.e. nitrogen, and passage of said gas to another bed in the system, initially at lower pressure and undergoing repressurization, for pressure equalization between the beds. The bed is then further cocurrently depressurized with release of additional quantities of less readily adsorbable component and passage of said gas to an external storage vessel for use in providing purge gas to a bed in the system. Simultaneously with said cocurrent depressurization steps indicated above, a cocurrent displacement step is carried out by introduction of gas essentially free of the less readily adsorbable component to the feed end of the bed. Further cocurrent depressurization is then carried out with discharge of the desired CO intermediate component from the product end of the bed. The bed is then countercurrently depressurized to remove the most readily adsorbable component, i.e. $CO_2$, from the feed end of the bed. In this embodiment, which is illustrated in Table III below, a portion of this countercurrent depressurization gas is diverted for pressurization and use as the displacement gas for another bed in the system. The bed is then purged with the purge gas being provided from said external storage vessel, after which the bed is repressurized to higher absorption pressure.

TABLE III

| BED NO. | CYCLE | | | | | | | | | | | |
|---|---|---|---|---|---|---|---|---|---|---|---|---|
| 1 | A | 1 | C E | BD | | D | | P | | 1 R | | |
| 2 | 1 R | | A | | 1 C E | BD | | D | | P | | |
| 3 | P | | 1 R | | A | | 1 C E | BD | | D | | |
| 4 | D | | P | | 1 R | | A | | 1 C E | BD | | |
| 5 | BD | | D | | P | | 1 R | | A | | 1 C E | |
| 6 | 1 C E | BD | | D | | P | | 1 R | | A | | |

In this Table, A, 1, C, E, BD, D, P and R have the same meanings as in Table I above. In this illustrative example of the invention, the feed gas mixture is introduced into the bed at a pressure of 9 bar, with the processing cycle being seen to include only one bed on said adsorption step at any given time. The bed pressure is reduced to 4 bar during the cocurrent displacement, cocurrent depressurization-pressure equalization and provide purge steps, i.e. during steps 1, C and E. During cocurrent depressurization step BD during which intermediate component CO is recovered, further depressurization to 1-2 bar occurs, and 99% CO is extracted from the product end of the bed. Countercurrent depressurization step D is carried out to 0.4 bar, with the gas thereby released from the feed end of the bed containing about 42% $CO_2$ and 52% CO. This gas is conveniently repressurized and introduced to another bed in the system as the displacement gas used during step C. Gas obtained during step D in the illustrated Table can thus advantageously be used as displacement gas for the second higher numbered bed in the system, for example, such gas from step D of bed 5 can be used for introduction to bed 1 during step C therein, and gas from step D of bed 1 can be used as displacement gas for bed 3. In the passing of cocurrent depressurization gas to an external storage vessel, those skilled in the art will appreciate that it is desirable that said gas, which is added to said vessel in an indirect pressure equalization as opposed to direct pressure equalization in which the gas passes directly from one bed to another, be added to the external vessel with plug flow so as to maintain the component composition profile of the gas as it is removed from the bed. By such means, the highest purity purge gas will be added and retained in the external vessel first with less pure gas being so added and retained separately. Upon subsequent release of gas from said vessel through the same end at which gas was added thereto, relatively more impure and then relatively more pure gas will be discharged from the vessel, enabling, for example, purge to be carried out using the most pure gas for the final portions of said purge step. The purge gas effluent, having a composition of 36.6 mol % nitrogen, 24.4 mol % CO and 39.0 mol % $CO_2$, may desirably be used as a fuel gas to enhance the overall gas separation operation.

It will be understood that various changes and modifications can be made in the details of the PSA process with intermediate product recovery as herein described and illustrated above without departing from the scope of the invention as set forth in the appended claims. Thus, the number of beds employed, the number of cocurrent depressurization-pressure equalization steps employed, whether or not such pressure equalizations are direct or indirect through an external storage vessel, whether the displacement gas employed is available from an external source or is supplied by diverting a portion of the intermediate product or the countercurrent depressurization gas, as in the various examples above, may all be varied depending upon the circumstances and results desired in any given application. Likewise, the multicomponent gas separation desired, the intermediate component to be recovered and the desired purity level thereof, the use of countercurrent depressurization, with or without purge, or the use of a purge step, with or without countercurrent purge, the use of an external vessel for providing purge gas or the alternate use, also in accordance with conventional practice, of cocurrent depressurization-direct provide purge to another bed, may be subject to wide variation within the scope of the invention. It will be appreciated that PSA systems necessarily incorporate various conduits, valves, and other control features to accomplish the necessary switching of adsorbent beds from one step to the next, in appropriate sequence as, in conventional PSA operations. It will also be appreciated that the invention can be carried out using any suitable adsorbent material having a selectivity for various components of a feed gas mixture over other such components, thereby providing a less readily adsorbable component, an intermediate component and a more readily adsorbable component. Suitable adsorbents known in the art and commercially available include zeolitic molecular sieves, activated carbon, silica gel, activated alumina and the like. The Kiyonaga patent, U.S. Pat. No. 3,176,444, and the patents referred to above contain further information concerning the various known adsorbents used for PSA operations and suitable for use in the practice of the invention.

From the description and examples above, it will be seen that the invention provides a highly practical means for separating and recovering an intermediate component from a feed gas mixture. The process of the invention enables such desirable intermediate product recovery to be achieved in an advantageous manner compatible with conventional multi-bed PSA processing. Thus, the processing and mechanical complexity of employing pairs of said beds to achieve the desired recovery of the intermediate component is obviated, and the invention is carried out with only relatively minor modification of existing PSA processing techniques. In highly desirable embodiments, the countercurrent depressurization gas or a portion of the intermediate component product is readily recycled for use as the displacement gas in the cocurrent depressurization-less readily adsorbable component displacement step that enables desired intermediate product recovery to be accomplished upon further cocurrent depressurization of the bed. A variety of desirable gas separations, such as the recovery of CO from basic oxygen furnace gas, are thus made possible for use in practical commercial operations. Such applications enhance and extend the development of the PSA technology in providing practical, commercially feasible approaches for meeting the growing gas separation and recovery requirements of industrial societies.

I claim:

1. A pressure swing adsorption process for the separation of a feed gas mixture containing a less readily adsorbable component, an intermediately adsorbable component and a more readily adsorbable component, with recovery of said intermediate component as a desired product, in an adsorption system having at least four adsorbent beds, in each of which, on a cyclic basis, undergoes a processing sequence comprising:
   (a) introducing the feed gas mixture to the feed end of the adsorbent bed at a higher adsorption pressure, with the less readily adsorbent component being discharged from the product end of the bed, and with a leading adsorption front of said intermediate component of said feed gas mixture being established in the bed ahead of a trailing adsorption front of said more readily adsorbable component of said feed gas mixture;
   (b) introducing to the feed end of the bed a displacement gas essentially free of the less readily adsorbent component, the molar concentration of said intermediate and/or more readily adsorbable components being greater in said displacement gas than in the feed gas mixture, said gas being introduced such that the less readily adsorbable component is essentially completely displaced from the bed prior to initiation of intermediate component recovery;
   (c) cocurrently depressurizing said bed with discharge of said intermediate component from the product end thereof as a product of desired purity;
   (d) countercurrently depressurizing and/or purging the bed to remove said more readily adsorbable component therefrom; and
   (e) repressurizing said bed to the higher adsorption pressure,
   whereby the intermediately adsorbable component can be recovered as a separate product of desired purity rather than being recovered with the least readily adsorbable component, or with the more readily adsorbable component or as a waste stream with said less and more readily adsorbable components.

2. The process of claim 1 and including cocurrently depressurizing said bed to remove less readily adsorbable component gas from the product end thereof prior to the introduction of cocurrent displacement gas to the feed end of said bed.

3. The process of claim 1 and including cocurrently depressurizing said bed to remove less readily adsorbable component gas from the product end thereof at the same time cocurrent displacement gas is introduced to the feed end thereof.

4. The process of claim 1 and including cocurrently depressurizing said bed to remove residual less readily adsorbable component gas from the product end thereof subsequent to the time that cocurrent displacement gas is added to the feed end thereof.

5. The process of claim 1 in which the bed is countercurrently depressurized to lower desorption pressure to remove said more readily adsorbable component therefrom.

6. The process of claim 1 in which said bed is purged to remove said more readily adsorbable component therefrom.

7. The process of claim 1 in which said bed is countercurrently depressurized to lower desorption pressure and is purged at said lower pressure to remove said more readily adsorbable component therefrom.

8. The process of claim 1 and including diverting a portion of the intermediate component gas discharged from the product end of one bed for use as displacement gas for another bed included in said adsorption system.

9. The process of claim 1 and including recycling more readily adsorbable component gas removed from the feed end of one bed, or a portion thereof, as displacement gas to the feed end of another bed in the absorption system.

10. The process of claim 9 in which a portion of said more readily adsorbable component removed from the feed end of said bed is removed from the system.

11. The process of claim 1 in which less readily adsorbable component gas released from the product end of the bed during cocurrent depressurization step (b) is introduced into another bed for pressure equalization purposes.

12. The process of claim 2 in which less readily adsorbable component gas released from the product end of the bed during cocurrent depressurization thereof is passed to an external storage vessel to be used to provide purge gas to a bed in said system.

13. The process of claim 1 in which the adsorption system comprises four adsorbent beds with each bed undergoing the following processing sequence, in turn, on a cyclic basis:
   (a) adsorption at higher pressure;
   (b) cocurrent displacement with said gas essentially free of the least readily adsorbable component with only one bed undergoing the adsorption-cocurrent displacement sequence at given time;
   (c) cocurrent depressurization with release of less readily adsorbable component and passage of said gas to another bed undergoing repressurization for pressure equalization purposes:
   (d) cocurrent depressurization with release of less readily adsorbable component and passage of said gas to an external storage vessel for use in providing purge to a bed in said system;
   (e) cocurrent depressurization with discharge of said intermediate component from the product end of the bed;
   (f) countercurrent depressurization to remove said most readily adsorbent component from the bed;
   (g) providing purge gas to said bed;
   (h) pressure equalization with another bed normally at higher pressure; and
   (i) repressurization to higher adsorption pressure.

14. The process of claim 1 in which the adsorption system comprises five adsorbent beds, with one bed on adsorption and another bed on said cocurrent displacement step at all stages of the overall processing sequence, with each bed undergoing the following processing sequence:
   (a) adsorption at higher pressure;

(b) cocurrent displacement;
(c) cocurrent depressurization with release of the less readily adsorbable component for passage to another bed undergoing repressurization for pressure equalization therewith.
(d) cocurrent depressurization with discharge of said intermediate component from the product end of the bed;
(e) purge or vacuum desorption to remove said more readily adsorbable component from the bed;
(f) pressure equalization by the passage thereto of gas from another bed being cocurrently depressurized; and
(g) repressurization to adsorption pressure.

15. The process of claim 1 in which each bed undergoes the following processing sequence, in turn, on a cyclic basis:
(a) adsorption at a higher adsorption pressure;
(b) cocurrent displacement by the introduction of gas essentially free of the less readily adsorbable component to the feed end of the bed;
(c) cocurrent depressurization with release of less readily adsorbable component and passage of said gas to another bed in the system undergoing repressurization for pressure equalization between said beds;
(d) cocurrent depressurization with discharge of intermediate component from the product end of the bed;
(e) countercurrent depressurization to remove said more readily adsorbable component from the feed end of the bed;
(f) pressure equalization with passage of gas to said bed from another bed in the system initially at higher pressure; and
(g) repressurization of said bed to higher adsorption pressure.

16. The process of claim 15 and including, after step (c), further cocurrent depressurization of the bed with release of additional quantities of less readily adsorbable component and passage of said gas to an external storage vessel for use in providing purge gas to a bed in said system, and further including providing purge gas from said external vessel to the bed following countercurrent depressurization thereof.

17. The process of claim 15 in which said less readily adsorbable component comprises hydrogen, said intermediate component comprises CO, and said more readily adsorbable component comprises a carbon dioxide-rich stream.

18. The process of claim 15 in which said less readily adsorbable component comprises nitrogen, said intermediate component comprises CO, and said more readily adsorbable component comprises carbon dioxide.

19. The process of claim 15 in which said less readily adsorbable component comprises hydrogen, said intermediate component comprises argon, and said more readily adsorbable component comprises CO.

20. The process of claim 19 in which said intermediate component also comprises nitrogen.

21. The process of claim 16 in which said adsorption system consists of at least four beds.

22. The process of claim 15 in which said cocurrent displacement step (b) and said cocurrent depressurization step (c) occur at the same time.

23. The process of claim 22 and including, after said simultaneous steps (b) and (c), further cocurrent depressurization of the bed with release of additional quantities of gas from the product end of said bed and passage of said gas to an external storage tank for use in providing purge to a bed in said system, and further including providing purge gas from said external vessel to the bed following countercurrent depressurization thereof.

24. The process of claim 23 in which said less readily adsorbable component comprises hydrogen, said intermediate component comprises CO and said more readily adsorbable component comprises carbon dioxide and methane.

25. The process of claim 15 in which each bed undergoes the following processing sequence, in turn, on a cyclic basis:
(a) adsorption at a higher adsorption pressure, with only one bed in the system being on its adsorption step at any given time;
(b) cocurrent displacement by the introduction of gas essentially free of the least readily adsorbable component to the feed end of the bed;
(c) cocurrent depressurization with release of less readily adsorbable component and passage of said gas to another bed in the system for pressure equalization between said beds;
(d) further cocurrent depressurization of the bed with release of additional quantities of less readily adsorbable component and passage of said gas to an external storage vessel for use in providing purge gas to a bed in said system;
(e) cocurrent depressurization with discharge of intermediate component from the product end of the bed;
(f) providing purge gas to said bed from said external storage vessel, the bed decreasing in pressure to a lower desorption pressure during said purge thereof;
(g) pressure equalization with passage of gas to said bed from another bed in the system initially at higher pressure; and
(h) repressurization of said bed to higher adsorption pressure.

26. The process of claim 25 in which said adsorption system comprises at least five beds.

27. The process of claim 25 and including diverting a portion of said intermediate component gas discharged during cocurrent depressurization step (e) as said cocurrent displacement gas of step (b).

28. The process of claim 27 in which said adsorption system comprises at least five beds.

29. The process of claim 27 in which said less readily adsorbable component comprises hydrogen, said intermediate component comprises CO, and said more readily adsorbable component comprises carbon dioxide and methane.

30. The process of claim 27 in which said less readily adsorbable component comprises hydrogen, said intermediate component comprises argon, and said more readily adsorbable component comprises CO.

31. The process of claim 30 in which said intermediate component also comprises nitrogen.

32. The process of claim 1 in which each bed undergoes the following processing sequence, in turn, on a cyclic basis:
(a) adsorption at a higher adsorption pressure;
(b) cocurrent depressurization with release of less readily adsorbable component and passage of said gas to another bed in the system initially at lower pressure and undergoing repressurization for pressure equalization between said beds;

(c) cocurrent displacement by the introduction of gas essentially free of the less readily adsorbable component to the feed end of the bed;

(d) cocurrent depressurization with discharge of intermediate component from the product end of the bed;

(e) countercurrent depressurization to remove the most readily adsorbable component from the feed end of the bed;

(f) pressure equalization with passage of gas to said bed from another bed in the system initially at higher pressure; and (g) repressurization of said bed to higher adsorption pressure.

33. The process of claim 32 and including, after step (c), further cocurrent depressurization of the bed with release of additional quantities of less readily adsorbable component and passage of said gas to an external storage vessel for use in providing purge gas to a bed in said system, and further including providing purge gas from said external vesselw to the bed following countercurrent depressurization thereof.

34. The process of claim 12 in which a portion of the countercurrent depressurization gas recovered during step (e) is diverted for use as the displacement gas for another bed in the system.

35. The process of claim 32 and including, after step (c), further cocurrent depressurization of the bed with release of additional quantities of less readily adsorbable component and passage of said gas to an external storage vessel for use in providing purge gas to a bed in the system, and further including, upon completion of cocurrent depressurization step (d), providing purge gas from said external vessel to the product end of the bed during countercurrent depressurization step (e).

36. The process of claim 33 in which said adsorption system comprises six beds.

37. The process of claim 32 in which said less readily adsorbable component comprises hydrogen, said intermediate countercurrent comprises CO, and said more readily adsorbable component comprises carbon dioxide.

38. The process of claim 32 in which said less readily adsorbable component comprises nitrogen, said intermediate component comprises CO, and said more readily adsorbent component comprises carbon dioxide.

39. The process of claim 32 in which said less readily adsorbable component comprises hydrogen, said intermediate component comprises argon, and said more readily adsorbable component comprises CO.

40. The process of claim 39 in which said intermediate component also comprises nitrogen.

* * * * *